United States Patent [19]

Martino et al.

[11] Patent Number: 5,276,314
[45] Date of Patent: Jan. 4, 1994

[54] IDENTITY VERIFICATION SYSTEM RESISTANT TO COMPROMISE BY OBSERVATION OF ITS USE

[75] Inventors: Michael J. Martino, Gardiner; Geoffrey L. Meissner, Poughkeepsie; Robert C. Paulsen, Jr., Highland, all of N.Y.

[73] Assignee: International Business Machines Corporation, Armonk, N.Y.

[21] Appl. No.: 864,887

[22] Filed: Apr. 3, 1992

[51] Int. Cl.⁵ .................................. G06F 7/04
[52] U.S. Cl. ........................... 235/380; 902/4; 340/825.31; 340/825.33; 380/23
[58] Field of Search ............... 380/23, 24, 25; 340/825.31, 825.32, 825.33; 235/380; 902/4, 5

[56] References Cited

U.S. PATENT DOCUMENTS

| | | | |
|---|---|---|---|
| 4,801,935 | 1/1989 | Cairns | 340/825.31 |
| 4,857,914 | 8/1989 | Thrower | 340/825.31 |
| 4,926,481 | 5/1990 | Collins, Jr. | 380/25 |
| 4,962,530 | 10/1990 | Cairns | 380/23 |
| 5,177,589 | 1/1993 | Covert | 380/25 |

FOREIGN PATENT DOCUMENTS 0306997 3/1989 European Pat. Off. .
8503785 8/1985 PCT Int'l Appl. .
2058417 4/1981 United Kingdom .

*Primary Examiner*—E. Rollins Cross
*Assistant Examiner*—Erick Solis
*Attorney, Agent, or Firm*—Bernard M. Goldman; Richard M. Ludwin

[57] ABSTRACT

A mechanism for an automated system to allow a user of the system to demonstrate his legitimacy by demonstration of secret knowledge. The mechanism is resistant to compromise by observation of its use. An array of symbols is presented to the user and the user is required to manipulate several symbols at once until assigned key symbols are manipulated into predetermined states. Doing so effectively prevents an observer from determining which symbols are the ones of interest. For example, pushing a button might cause several symbols in the array to exchange their positions. The user continues to do this, having, perhaps, to use several different buttons, until a certain subset of the symbols appears in certain locations within the array. (In this example, the arrangement of this subset of symbols is the user's password or PIN.) In this process many symbols in the array, in addition to the user's specific symbols, would also have been moved, making it virtually impossible for an observer to identify which symbols and array-positions are pertinent to the user's password or PIN.

20 Claims, 4 Drawing Sheets

IDENTITY VERIFICATION SYSTEM RESISTANT TO COMPROMISE BY OBSERVATION OF ITS USE

I. BACKGROUND OF THE INVENTION a. Field of the Invention

This invention relates to methods and devices for verifying the identity of the user of a secure device such as an automated transaction mechanism or computer.

b. Related Art

Electronic systems which require a user to identify himself and establish his authority to execute certain transactions are becoming common. There are, within many business establishments, systems which provide for electronic mail, payroll processing, accounts receivable processing and program development in addition to other applications far too numerous to mention. The use of personal computers in the home with access to extensive communications networks is increasing. Automatic Teller Machine (ATMs) are virtually everywhere and their capabilities are expanding. There are ATMs attached to banking networks that permit the withdrawal of cash and the transfer of funds from one account to another to name two commonplace applications. This trend extends even to the telephone system where long distance telephone calls are made without operator intervention based on the possession of a 'phone card' that authorizes the call.

One classical technique for verifying a user's identity (and hence, authority) requires the user to provide two proofs: one that only a legitimate user should have (for example a bank card) and one that only a legitimate user should know (e.g. a PIN). In order to compromise such a system, an imposter must obtain both the object (or a duplicate) and the secret knowledge (or its equivalent). The imposter can obtain the object by force or subterfuge and the secret knowledge by observation of the legitimate user in the act of demonstrating that knowledge (i.e. entering the PIN).

A number of mechanisms have been proposed and implemented to allow the user to demonstrate his authorization by supplying secret knowledge. A weakness in many of these systems is that the secret knowledge can be compromised by an observer. A common countermeasure is to suppress the display of the information as it is entered. Often, this is not effective because an observer might still see which keys or buttons are pressed. Another countermeasure is the use of a person's electronically recorded signature to demonstrate his identity (and hence authorization). This approach depends on the difficulty of reproducing either the signature or motions accurately. It has the weakness of being somewhat unreliable and giving many false negatives.

Another problem with the use of PINs is that they are difficult for most people to remember. This leads to another problem in that people will tend to write the PINs down rather then memorize them. This opens up other opportunities for compromise by losing the written record, or by having that paper stolen.

The ease of compromising the PIN by observation of its use is a weakness in today's ATM systems.

II. SUMMARY OF THE INVENTION

The present invention comprises a mechanism for an automated system to allow a user of the system to prove his legitimacy by demonstration of secret knowledge. This mechanism is an improvement over existing mechanisms used for this purpose in that it is resistant to compromise by observation of its use.

Existing automated systems that use passwords or Personal Identification Numbers generally require the user to specify the password or PIN by typing it directly into an input device such as a number-pad or keyboard. Since, in these systems, the user must directly identify the characters of his password or PIN it is easy for an observer to "steal" this knowledge by watching the actions of the legitimate user.

According to the present invention a user can demonstrate knowledge of his password or PIN without having to directly identify its individual symbols as they're entered into the input device. This is accomplished by presenting an array of symbols to the user and requiring him to manipulate several symbols at once. Doing so will effectively prevent an observer from determining which symbols are the ones of interest.

For example, pushing a button might cause several symbols in the array to exchange their positions. The user would continue to do this, having, perhaps, to use several different buttons, until a certain subset of the symbols appears in certain locations within the array. (In this example, the arrangement of this subset of symbols is the user's password or PIN.) In this process many symbols in the array, in addition to the user's specific symbols, would also have been moved, making it virtually impossible for an observer to identify which symbols and array-positions are pertinent to the user's password or PIN.

Another advantage of the present invention is that the symbols can be presented as shapes or pictures. This tends to alleviate the problems associated with memorizing a numerical PIN since, for many people, pictorial representations of an identification code (or icons) are easier to remember than a random sequence of numbers.

III. BRIEF DESCRIPTION OF THE DRAWINGS

The present invention will be better understood by reference to the drawings in which.

Like reference numerals appearing in more than one FIGURE designate like elements.

IV. DETAILED DESCRIPTION OF THE PREFERRED EMBODIMENT

Figure 1:
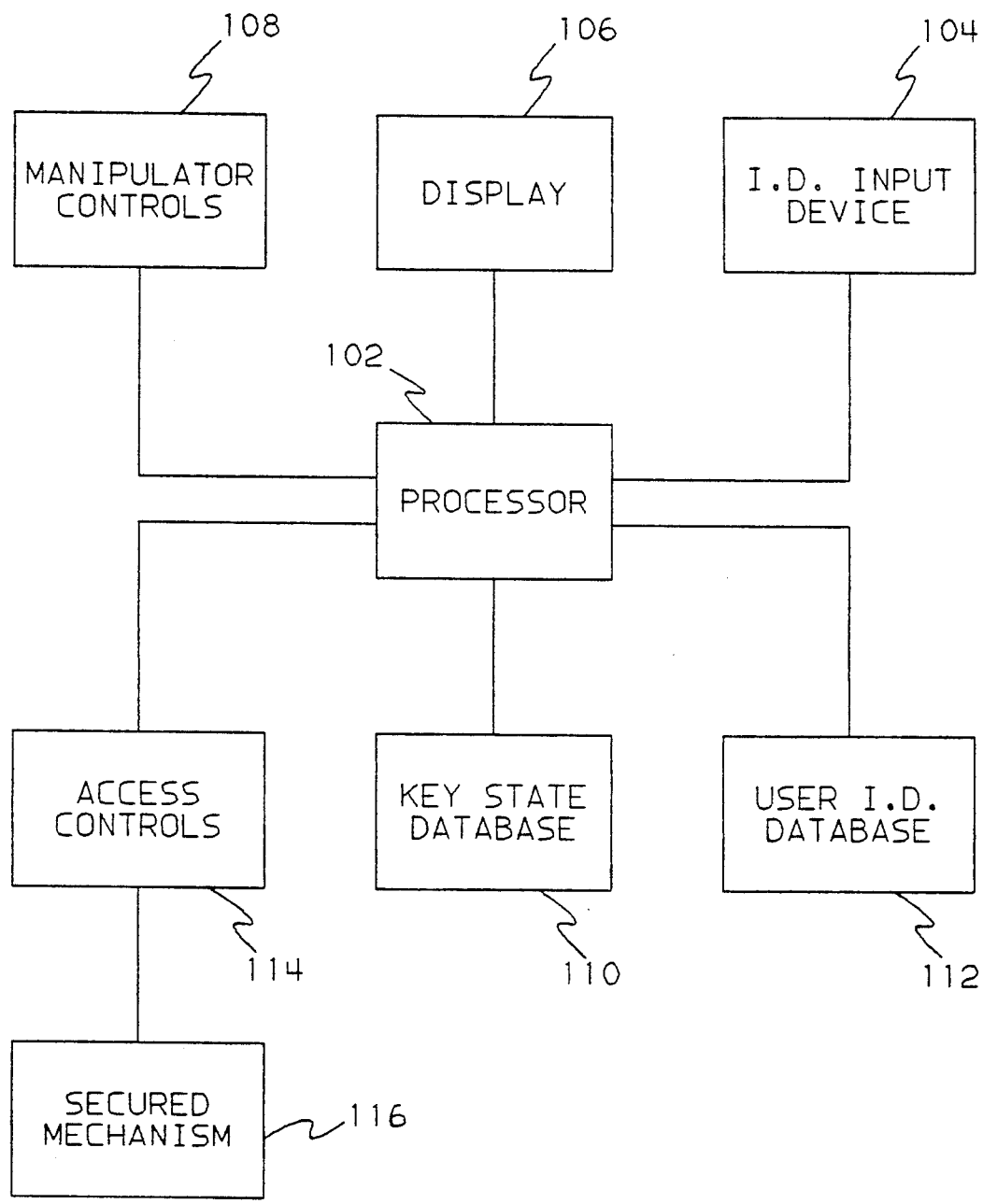
FIG. 1 is a block diagram of an apparatus according to the present invention.

FIG. 1 illustrates a generalized embodiment of the present invention in block diagram form. The system of FIG. 1 includes a processor 102 (which can be a general purpose computer such as work station or personal computer), a user I.D. input device 104 (which can be a keyboard or card reader), a means 106 to present information to the user (which can be a conventional video display, an array of LEDs or a tactile Braille output device), manipulator controls 108 (which can be a mouse, a touch screen device, a touch pad, buttons, joystick, track ball or audio pickup or any other input mechanism by which the processor can receive commands to manipulate the image on the display), a KEY STATE database 110, a user I.D. database 112 and access controls 114 which, on command of the processor 102, will enable a user to access a secured mechanism 116 (e.g. a lock for a room, computer files, an ATM dispenser). As an alternative embodiment, the KEY STATE database 110 and the USER I.D. database 112 may be eliminated by providing suitable information in protected form via the I.D. Input device, 104, (such as from the magnetic stripe on a charge card,).

In accordance with the present invention, each users PIN (or password or access code) is defined as a preassigned set of symbols (KEY SYMBOLS) in a preassigned configuration or state. The data defining these symbols and the preassigned configuration is referred to as the user's KEY STATE definition. The configuration of these KEY SYMBOLS within the ARRAY at any given time is referred to as the "KEY STATE". The user's PIN is entered by manipulating each of the KEY SYMBOLS into the correct configuration, position or state within the ARRAY. This correct KEY STATE (the user's personal KEY STATE) is defined by the user's KEY STATE definition and is specific to each user I.D. The correct KEY STATE constitutes secret knowledge which the user must demonstrate to obtain access to the secured mechanism.

The user's personal KEY STATE may be, for example, the positions of each of the KEY SYMBOLS within the ARRAY, irrespective of the placement and orientation of the pattern within the ARRAY. The initial ARRAY will contain, as a subset, the user's KEY SYMBOLs in some initial configuration or STATE. The configuration or state of the entire set of displayed symbols at any given time is referred to as the ARRAY STATE. A constraint on the initial ARRAY STATE is that the user's personal KEY STATE must be achievable with the transformations allowed by the manipulator controls 108. That is to say, the initial ARRAY STATE must be such that the user's KEY SYMBOLS can be manipulated into the proper state so as to form the user's PIN. Different initial ARRAY STATES that can be manipulated to achieve the user's personal KEY STATE are referred to as being in the same EQUIVALENCE CLASS. Initial ARRAY STATES that can not be manipulated to achieve the user personal KEY STATE are referred to as being in a different EQUIVALENCE CLASS.

Figure 2:
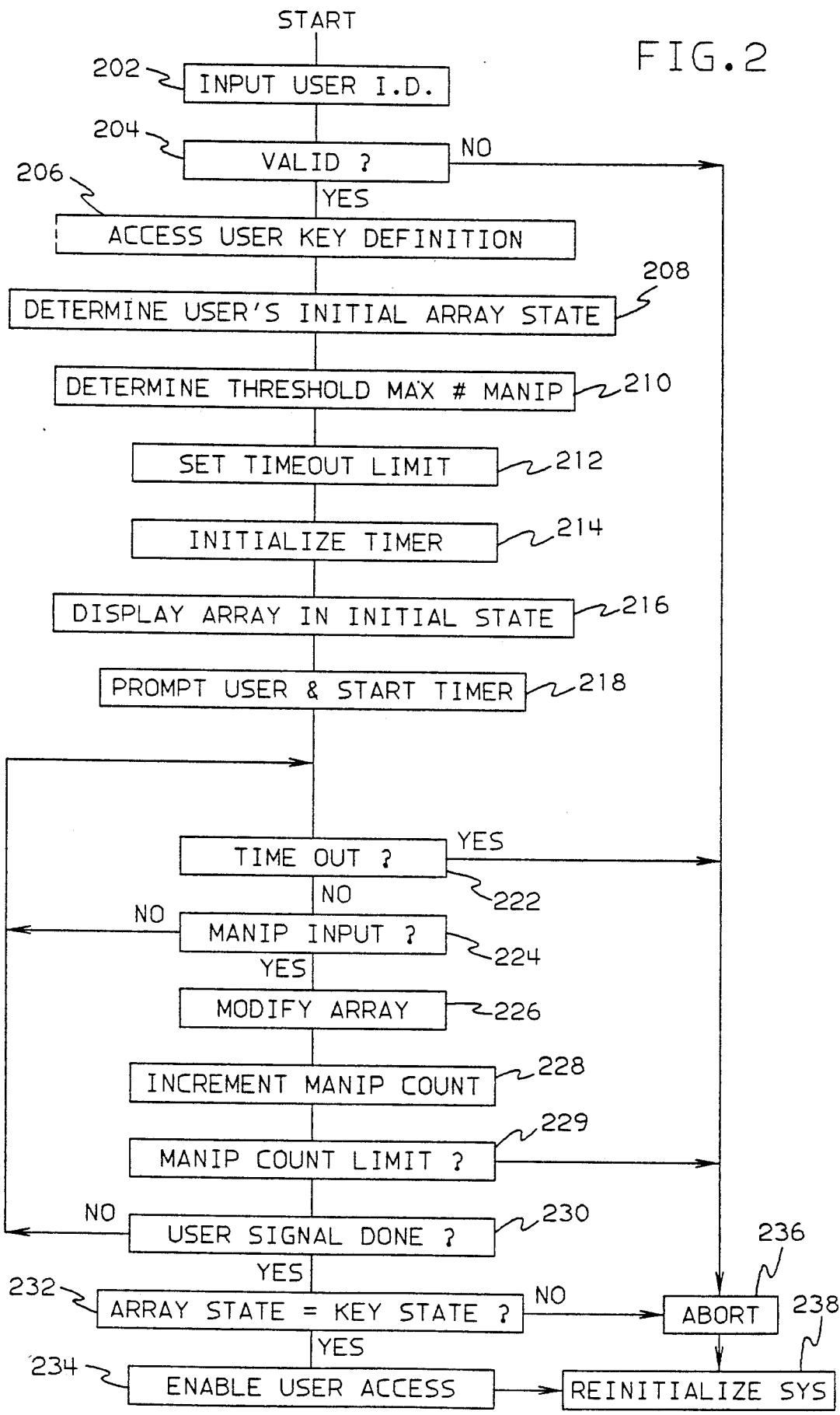
FIG. 2 is a flow chart of the operation of the apparatus of FIG. 1.

Turning now to FIG. 2, in step 202 a user initiates a transaction by inputting a user identification code into the I.D. input device 104. This can be accomplished, for example, by typing a user I.D. on a keyboard or placing a magnetically coded card into a reader. In step 204 the processor checks the user I.D. against the user I.D. database 112 to determine if it is valid. If the processor recognizes the user I.D. as valid (i.e. authorized to access the system), it responds by accessing the user's KEY STATE definition from the KEY STATE database in step 206.

In step 208 the processor determines an initial ARRAY STATE that contains an initial KEY STATE in the same EQUIVALENCE CLASS as user's personal KEY STATE. The initial ARRAY STATE can be determined in a number of different ways. For example, the processor 102 can start with the users KEY STATE definition and calculate the effects of random operations of the manipulator controls in reverse sequence. The number of the manipulations can also be determined as some random number beyond an initial threshold. Advantageously, the above described method can be used to ensure that the initial KEY STATE displayed to the user is unlikely to be the same for any two transactions. As another example, the initial KEY STATE can be fixed or can be chosen at random from a number of fixed options in the KEY STATE database 110.

The embodiment described here takes the precaution of limiting the number of manipulations that the user is allowed in attempting to achieve the correct KEY STATE. This threshold number is calculated by the processor in step 210. This threshold can be calculated a number of alternative ways based on the minimum number of steps required to transform the initial KEY STATE to the correct KEY STATE. For example, the threshold could be set so as to require the user to achieve the proper key state in the minimum number of steps required. As an alternative, some additional number of steps can be allowed (e.g. the minimum plus some percentage of the minimum).

In steps 212 and 214, a timeout limit is determined and the a timer is initialized to limit the amount of time that the user has to complete the manipulations. The timeout value can be also be determined in a number of different ways. For example, the timeout value can be calculated based on the minimum number of steps required to transform the initial KEY STATE to the correct KEY STATE (for example by multiplying a fixed allotted time value per manipulation by the minimum number of manipulation steps required). Alternatively, a fixed timeout value can be used; or, a fixed timeout value can be added to a variable timeout value based on the minimum number of steps as described above.

In any event, the manipulation threshold and timeout values are used in steps 222 through 236 as described below. Note that the nature of this invention provides the opportunity for these precautions.

In step 216 the ARRAY is displayed in the initial ARRAY STATE determined in step 206.

Next, in step 218 the processor begins a loop to process the user's input via the MANIPULATORS. The MANIPULATOR controls 108 are provided to enable the user to achieve his personal KEY STATE by transforming the SYMBOL STATEs. For example, in the system of FIG. 1, a SYMBOL STATE (any uniquely identifiable condition that a symbol can exhibit) can be defined by the position of the symbol in the ARRAY. It should be understood, however, that the SYMBOL STATE can be defined in many other ways.

Within the manipulation loop the processor monitors the user's use of the manipulators (step 224) and displays the modified ARRAY STATE in accordance with the user selected manipulations (step 226). Also, within the manipulation loop the processor keeps track of the time taken and the number of manipulations used (step 228) by the user. If these thresholds are exceeded (as determined in steps 222 and 229 respectively) the transaction is aborted (steps 236) and the system is reinitialized (step 238).

It should be understood that although shown as a single step for clarity, the timeout monitoring of step 222 is performed continuously from the time that step 218 is executed, until either the transaction is aborted (step 236) or the user signals "done" (step 230), whichever occurs first. That is to say that if a timeout occurs at any point between the start of the timer in step 218 and the user signalling "done" in step 230, the transaction will be aborted.

When the user is satisfied that he has manipulated the array into the proper KEY STATE, he signals (for example by pressing a key or a button) to request verification of his password. This signal is detected at step 230. In response to this signal, in step 232 the system compares the user's KEY STATE definition (retrieved in step 206) with the displayed ARRAY STATE. If the users KEY STATE is found correctly in the FINAL ARRAY STATE (the displayed ARRAY STATE at the time the user signals that he is satisfied), in step 234 the system provides the user access to the controlled resource and, at the conclusion of the user's transaction, re-initializes the system in step 238. In the event that the user's entry is determined (in step 232) not to be correct, then the transaction is aborted in step 236 and the system is re-initialized in step 238.

Figure 3:
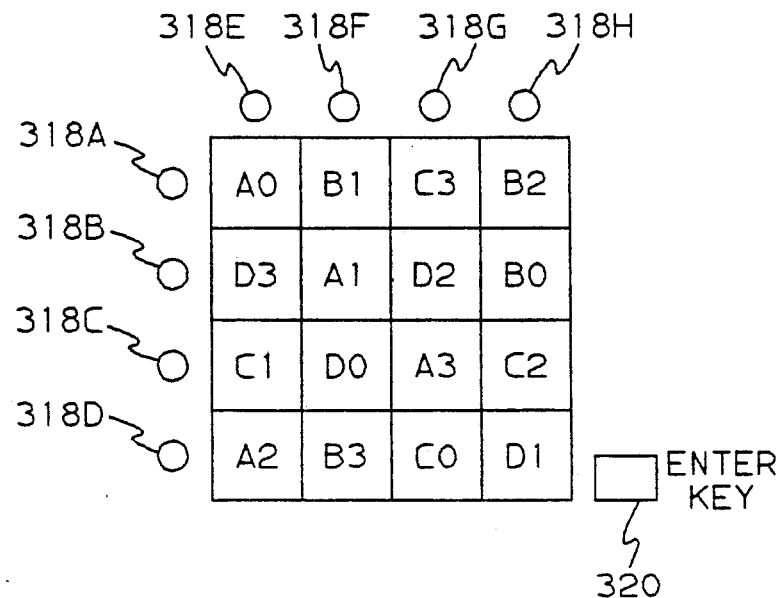
FIG. 3 is an example of a display screen showing an initial ARRAY STATE according to an embodiment of the present invention.

An example of an ARRAY of symbols as they might appear on the display of FIG. 1 and an associated manipulator mechanism is illustrated in FIG. 3. By using the manipulator buttons 318 (a–h) the user may alter the positions of the symbols (A0-D3). In the example of FIG. 3, there are 4 key symbols SYMBOLs (B1, A1, C2, D2). Pressing a manipulator button on a given column or row shifts the entire corresponding string (row or column) of SYMBOLS in a circular fashion in the direction of the button. Thus, on each manipulation, symbols other than the KEY SYMBOLs are also shifted, thereby preventing an observer from knowing which set of SYMBOL STATEs constitute the KEY STATE.

When the user is done manipulating the ARRAY the ENTER key 320 is pressed on the manipulator controls so indicating. This is detected in step 230 of FIG. 2. In response, in step 232, the processor compares the KEY STATE of the modified ARRAY with the user's KEY STATE definition retrieved from the KEY STATE database 110 in step 206. If the KEY STATE within the displayed ARRAY matches the user's KEY STATE definition (as determined in step 232), the processor signals the access controls 114 which, in turn, enables the user to access the secured mechanism in step 234. After the access is complete, in step 238 the processor can reinitialize the system to prepare for another user.

If, in step 230, it is determined that the KEY STATE of the displayed ARRAY does not match the user's KEY STATE, the transaction is aborted and the system is reinitialized. The processor can also store the number of failed attempts to enter a PIN by any given user. In such an embodiment, the processor can be programmed to prevent attempts by a given user beyond a predetermined failed-attempt threshold.

Figure 4:
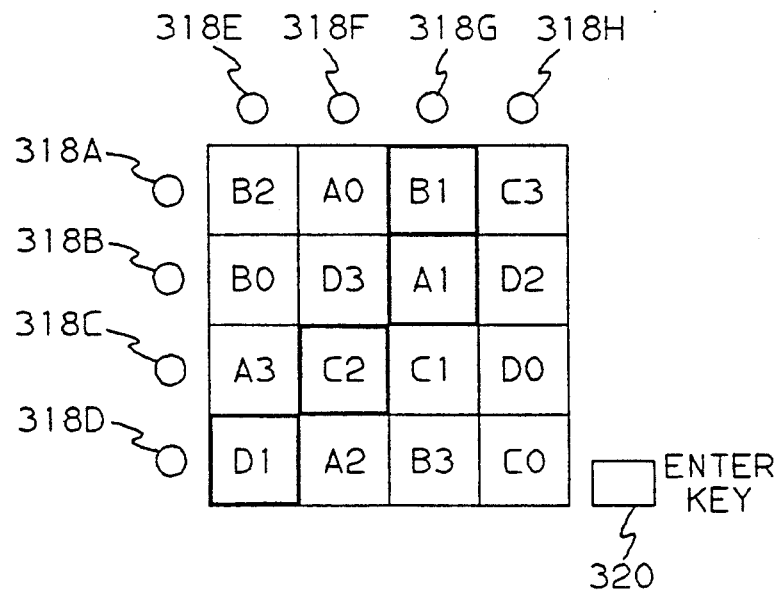
FIG. 4 is an example of the display screen of FIG. 1 showing a final ARRAY STATE including a users authorized KEY STATE.

FIG. 4 is an example of the ARRAY of FIG. 3 having the KEY SYMBOLS (B1, A1, C2, D1) in the proper KEY STATE defining the users PIN. In this example, the manipulation of the array would require 12 steps. These steps are: three presses of button 318(a) so as to shift symbol B1 three places to the left, three presses of button 318(b) so as to shift symbol A1 three places to the left, two presses of button 318(c) so as to shift symbol C2 three places to the left and four presses of button 318(d) so as to shift symbol D1 four places to the left. In general, with the embodiment described here, vertical transformations (accomplished by pressing manipulator buttons 318(e)-318(h)) would also be required to achieve the user's KEY STATE (illustrated in FIG. 4) from the initial ARRAY STATE (FIG. 3) but, for simplicity's sake, are not required in this example.

Shifting is, of course, just one example of how the state of a symbol can be transformed. Other types of transformations (e.g. color, shape or orientation changes) can be used as an alternative as long as the MANIPULATORs affect groups of SYMBOLs without identifying any specific SYMBOLs in the group as unique. In other words, the set of symbols to be manipulated is identified by the user as a whole.

Figure 5:
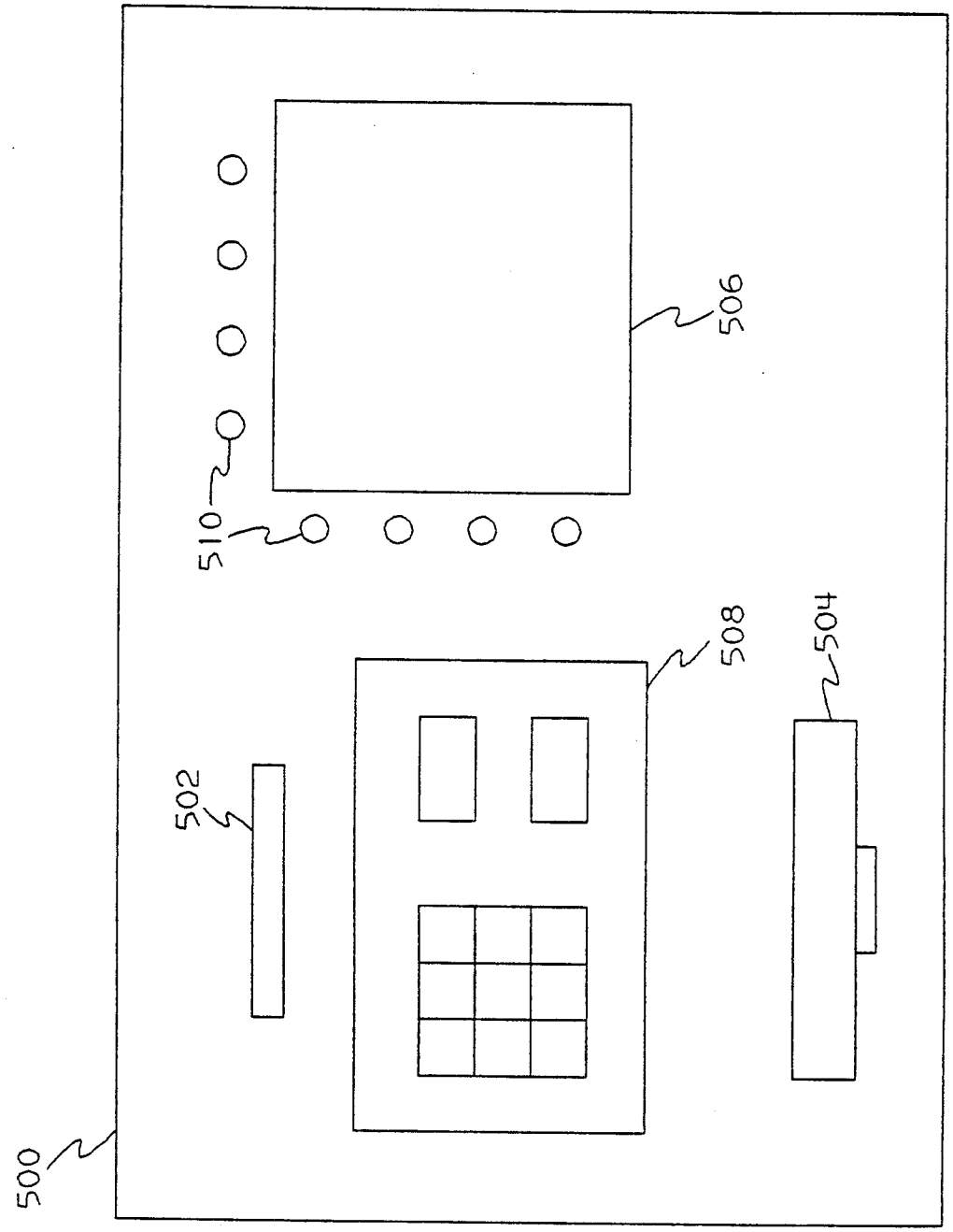
FIG. 5 is an illustration of an Automated Teller Machine (ATM) according to an embodiment of the present invention.

Turning now to FIG. 5, an automated teller machine (ATM) 500 according to an embodiment of the present invention is illustrated. As is conventional, the ATM includes a slot 502 for receiving a magnetically coded identification card (ATM card), a dispenser 504 for distributing cash and/or a transaction record, a display screen 506 for displaying information to a user and a keyboard 508 by way of which the user can select a transaction, respond to inquiries and input other information. These features and the workings of their associated support mechanisms are well known in the art. In accordance with the present invention, the ATM of FIG. 1 also includes manipulator buttons 510 arranged in row and column fashion along the periphery of the display screen 506.

In accordance with an embodiment of the present invention, a user initiates a transaction by placing the ATM card into the slot 502. If the ATM 500 successfully reads the card, it responds by displaying an array of symbols of the display screen 506. At this point, the user is prompted to manipulate the symbols into new array positions. As with the embodiment of FIG. 1, the user manipulates each of the KEY SYMBOLS into the correct position within the ARRAY. This correct KEY STATE is specific to each user or account as identified by the ATM card. If the user successfully manipulates the ARRAY to the correct KEY STATE within a threshold number of steps, the ATM allows a user selected transaction to proceed to completion. If the user does not successfully manipulate the ARRAY, the transaction is not allowed to proceed or is aborted.

A system embodying the present invention can protect itself from compromise by an observer simply remembering and reproducing an observed final ARRAY STATE (i.e. state of the entire array). It can also protect itself from an observer remembering and reproducing the sequence of actions performed by the legitimate user. This is accomplished in two basic ways:

1. Choosing initial ARRAY STATEs from a large universe of EQUIVALENCE CLASSes.

Depending on the actual ARRAY, SYMBOLs and MANIPULATORs, the number of equivalence classes can be extremely large. This can make it impossible, or highly unlikely, that any arbitrary final ARRAY STATE can be achieved, by use of the MANIPULATORs from an initial ARRAY STATE. At the same time, the initial KEY STATE must be chosen to be in the same EQUIVALENCE CLASS as the user's personal KEY STATE to make it possible for the user to achieve his personal KEY STATE.

It is possible to satisfy both conditions with appropriately chosen STATE and MANIPULATOR definitions since there are fewer constraints on the achievable KEY STATEs then there are on the achievable ARRAY STATEs when, as defined here, the KEY STATE is a subset of the ARRAY STATE. For example, the initial ARRAY STATE of FIG. 3 could have the initial positions of each of the KEY SYMBOLS shifted up by one column, also symbols other than the KEY SYMBOLS could be changed completely (e.g. C7 or F1 could replace C5). As another example, the manipulator buttons could be programmed to cause rows or columns of symbols to be swapped with a succeeding or preceding row or column.

The net effect is a one-way, or "trap door", function. That is, an authorized user can easily achieve the desired final KEY STATE from the initial KEY STATE without regard to the overall final ARRAY STATE, but an observer, only knowing a previous final ARRAY STATE can neither deduce the final KEY STATE nor reproduce the final ARRAY STATE. An imposter trying to compromise a system using this technique would find himself incapable of reproducing the final ARRAY STATE he had originally observed, nor would he be able to achieve the correct KEY STATE by simply mimicking the legitimate user's actions.

2. Making the user's personal KEY STATE differ from one use of the system to another.

This can be done by making the user's personal KEY STATE in some way dependent on the initial ARRAY STATE and choosing from a large universe of initial ARRAY STATEs. For example, the initial ARRAY STATE could be randomized (within the above constraint) and furthermore require that one of the KEY SYMBOLs be left in its initial, randomized, state. For example, in the ARRAY of FIG. 3, a user's key might be defined by the relative positions of A1, C2 and D1 to the initial randomized position of B1.

An imposter trying to compromise a system using this technique would find that even if he were to reproduce a previously observed final ARRAY STATE, the KEY STATE appropriate to this instance would not be achieved. Again, mimicking the legitimate user's actions would not achieve the correct KEY STATE.

Using a combination of these two methods greatly improves the security of the system.

In addition to providing a method of use that is resistant to compromise by observation, this invention also provides some other benefits. The concept of an ARRAY and a STATE within that ARRAY, significantly adds to the security of a password or PIN by increasing the size of the key-space. (For example, most PINS today are shared by literally hundreds of people. This is a consequence of the size of the PIN key space (for a four digit PIN its maximum size is 10,000, while there may be as many as 200,000 customers of a given bankcard). Even with the increased key-space, a system using the present invention can provide an easier-to-remember PIN by using pictured ICONS (as SYMBOLS) on a full graphical data output device.

An ATM machine is only one example of the applicability of the present invention. The present invention can just as readily be applied to any device or area whose access is secured by a personalized code. For example, the present system can be implemented on a computer system which is used to control access to a secured area (e.g. by unlocking a door when the PIN is entered properly). As another example, the present system could be used to control access to a secure computer program or data area of the system by providing access only to those who log on using an authorized user name and are able show special knowledge by manipulating the ARRAY into the proper KEY STATE for that user name.

It should be understood that the embodiments described herein have been provided by way of example and not by way of limitation. In light of the foregoing description, many modifications and variations which do not depart from the scope and spirit of the invention will occur to those of skill in the art. Thus, the scope of the invention is defined by the appended claims.

Having thus described our invention, what we claim as new and desire to secure by Letters Patent is:

1. A system for providing access to a secure device, comprising:
   input means for receiving user identification information;
   display means, coupled to said input means, for displaying a plurality of symbols in an initial state, said plurality of symbols including a subset of key symbols which are elements of an access key corresponding to said user identification information;
   manipulator means, coupled to said display means, for simultaneously changing a displayed state of a multiplicity of said symbols;
   comparison means, coupled to said manipulator means, for comparing a displayed state of said key symbols with a key state defining said access key; and,
   access authorization means, coupled to said comparison means, for providing access to said secure device when said comparison means indicates that said displayed state of said key symbols matches said access key.

2. The system of claim 1 wherein said key state is defined by a color of said symbols.

3. The system of claim 1 wherein said said key state is defined by a position of said symbols on said display means.

4. The system of claim 1 wherein said initial state of said symbols is in the form of a row and column array.

5. The system of claim 4 wherein said manipulator means comprises means for simultaneously altering a row or column position of a plurality of said symbols within said array.

6. The system of claim 1 further comprising first database means, coupled to said input means, for storing data defining a plurality of key states and for retrieving said access key responsive to receipt of said user identification information.

7. The system of claim 6 further comprising second database means, coupled to said input means, for storing data indicative of a plurality of users and processor means for comparing said user identification with said users in said database to determine whether an authorized user is attempting to access said secure device.

8. The system of claim 7 wherein said input means comprises means for receiving an identification card, said identification card having means for storing said user identification information.

9. The system of claim 1 wherein said input means comprises means for receiving an identification card, said identification card having means for storing said user identification information and said key state.

10. The system of claim 1 further comprising signal means, coupled to said authorization means, for indicating when a user has completed manipulation of said symbols and wherein said authorization means is operable responsive to said signal means.

11. A system for providing access to a secure device, comprising:
   input means for receiving user identification information;

verification means coupled to said input means, for determining whether said user identification information is indicative of an authorized user of said secured device and for denying access to said secure device when said identification information is not indicative of an authorized user;

display means, coupled to said input means for displaying a plurality of symbols in a row and column array, said plurality of symbols including a subset of key symbols which are elements of an access key corresponding to said user identification information;

manipulator means, coupled to said display means, for simultaneously changing a displayed position of a multiplicity of said symbols;

signal means, for indicating when a user is finished changing said displayed position;

comparison means, coupled to said signal means, for comparing a displayed state of said key symbols with a key state defining said access key when said signal means indicates that said user is finished displaying said symbols; and, access authorization means, coupled to said comparison means, for providing access to said secure device when said comparison means indicates that said displayed state of said key symbols matches said access key.

12. A method of providing access to a secure device, comprising the steps of:

receiving user identification information;

displaying a plurality of symbols in an initial state, said plurality of symbols including a subset of key symbols which are elements of a user access key corresponding to said user identification information;

simultaneously changing a displayed state of a multiplicity of said plurality of symbols;

after said changing, comparing a displayed state of said key symbols with a key state defining said user access key; and, providing access to said secure device when said comparing indicates that said displayed state of said key symbols matches said user access key.

13. The method of claim 12 wherein said said access key is defined by a position of a symbols on said display means.

14. The method of claim 12 wherein said initial state of said symbols is in the form of a row and column array.

15. The system of claim 14 wherein said simultaneously changing comprises the step of simultaneously altering a row or column position of a multiplicity of said symbols within said array.

16. The method of claim 12 further comprising the step of storing data defining a plurality of access keys and retrieving said user access key responsive to receipt of said user identification information.

17. The method of claim 16 further comprising the steps of storing data indicative of a plurality of users and, comparing said user identification information with said users in said database to determine whether an authorized user is attempting to access said secure device.

18. The method of claim 17 wherein said receiving comprises the step of receiving an identification card, said identification card having means for storing said user identification information.

19. The method of claim 12 wherein said receiving comprises the step of receiving an identification card, said identification card having means for storing said user identification information and said user access key.

20. The method of claim 12 further comprising the step of indicating when a user has completed manipulation of said symbols performing said comparing responsive to said indicating.

* * * * *